J. W. HYATT.
Tumbling-Polisher.

No. 215,751.      Patented May 27, 1879.

WITNESSES.
J. Snowden Bell
J. Walter Douglass

INVENTOR.
John W. Hyatt
by Henry Baldwin Jr.
Atty.

UNITED STATES PATENT OFFICE.

JOHN W. HYATT, OF NEWARK, NEW JERSEY.

IMPROVEMENT IN TUMBLING-POLISHERS.

Specification forming part of Letters Patent No. 215,751, dated May 27, 1879; application filed October 26, 1878.

*To all whom it may concern:*

Be it known that I, JOHN W. HYATT, of Newark, in the county of Essex and State of New Jersey, have invented certain new and useful Improvements in Tumbling-Machines, of which improvements the following is a specification, reference being had to the accompanying drawings, making part thereof, and in which—

Figure 1:
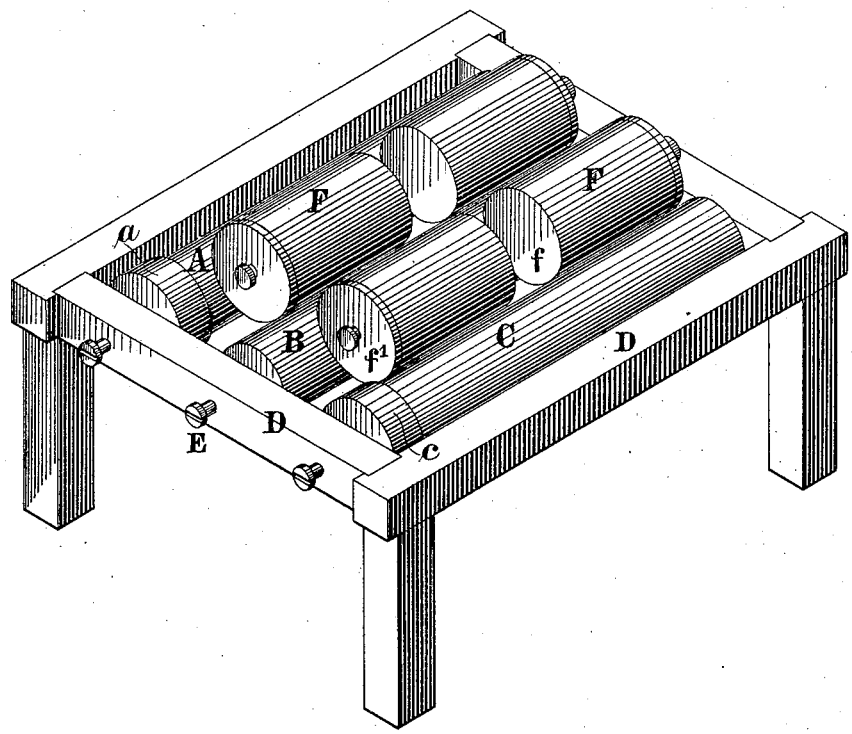
Figure 2:
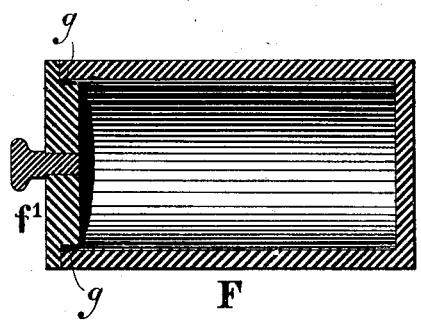
Figure 3:
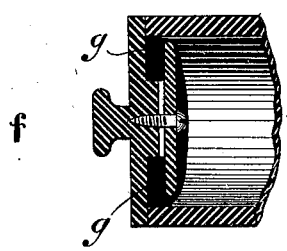

Figure 1 is a view in perspective of my improved machine; Fig. 2, a longitudinal central section through one of the tumbling-cylinders; and Fig. 3, a similar section, showing the removable cylinder-head, composed of two plates clamping a rubber gasket between them by means of a screw.

It is the object of my invention to finish slate-pencil blanks formed by the machine for grinding and shaping slate described in Letters Patent of the United States No. 204,151, granted and issued to me under date of May 28, 1878, these blanks as formed by that machine requiring to be tumbled, especially to remove the fin left by the grooved grinding and shaping rolls.

While I am aware that tumbling-boxes are well known and used for a great variety of purposes, yet in my endeavors to adapt them to tumbling slate-pencil blanks I found difficulties arising, first, from the brittle nature of the slate when reduced to such small pieces, and, second, from the loss of time and prohibitory expense attending the operation by any of the methods then known.

The essentials of this operation, as applied to slate-pencil blanks, are economy of time and labor, which can only be obtained by tumbling in large numbers and with a quick finish, and, second, in avoiding, as far as possible, breakage and want of uniformity in finish.

I have attained these ends by means of my improvements, which consist in using tumbling-cylinders of small diameter and of length but little more than that of the pencil-blanks, and instead of rotating these cylinders by a crank or winch, as usual heretofore, rotating them by means of horizontal rollers arranged in series of three, five, or more, the cylinders resting lengthwise upon two adjacent rollers, so that, the rollers being rotated, the adhesion between their surfaces and those of the cylinders rotates the cylinders and effects the tumbling operation. The limited diameter and length of the cylinders keeps the blanks during the entire tumbling operation level and in line, so that they are not broken, as heretofore, and are finished with greater uniformity.

In the accompanying drawings I have represented an economical form of this apparatus, which I have found effective in practical operation. The rollers A B C are made of wood, and instead of being secured upon shafts are mounted in the frame D upon adjustable bearing-pins E. The outer rollers, A and C, have pulleys *a* and *c* turned on their ends, and are driven by belts, so as to rotate in the same direction. This series of rollers may be multiplied by additional rollers, alternately with and without pulleys, or by additional series arranged one series above the other.

The tumbling-cylinder F is made of metal, with both its inner and outer surfaces unbroken and truly cylindrical. One end of this cylinder is permanently closed with a head, $f'$, and the other end is fitted with a removable head, $f$, provided with a rubber gasket, $g$, or other water-tight joint, and fitted tightly into the cylinder. The edges of the heads should not project beyond the line of the cylinder, in order that the cylinder may bear upon the rollers throughout its entire length. The length of the cylinder should be such that when closed the space between the cap and the bottom of the cylinder is very little more than the length of the blanks. As to the diameter, I am unable to give a definite rule for determining the limits within which it may be varied, as this depends in some measure upon the depth to which the cylinder is filled with the blanks and the speed with which the rollers are driven; but the diameter should be small enough to prevent the blanks from tilting or tumbling out of level, as the restricted length keeps them from tumbling out of line.

The blanks formed by the grinding and shaping machine above referred to, or otherwise, are placed, either alone or with water, or with sand or emery, in the cylinders, in such quantities as to still leave them room for the proper movement, and the removable heads are placed in position to close the open cylinder ends, and the cylinders are laid end to end, some upon and between the rollers A and B and some upon and between the rollers B and C. The rollers A and C being then rotated by the belts in the same direction, the cylinders adhering upon the surface of the rollers will rotate toward the roller B, and will rotate this roller in the same direction as the rollers A and C, the cylinders acting in the manner of idlers. The cylinders being thus rotated on their own surfaces and being kept horizontal throughout their entire length without being jarred, the pencil-blanks are kept level and in line, and are rapidly finished with a uniformity not heretofore attained.

The number of cylinders which can be used at once is simply limited to the number and length of the rollers upon which the cylinders are placed, and I have found that, for example, in the instance shown in the drawings, another series of cylinders may be placed upon and between the two series shown, the lower cylinders themselves acting as rollers to the superimposed series; but this extreme availability of capacity is not requisite, inasmuch as a single series of rollers with a double line of cylinders, as shown in the drawings, will finish a very large number of pencils in a day and reduce the cost in time and labor to as low a point as the demand necessitates.

Having thus described the nature and objects of my invention, what I claim as new, and desire to secure by Letters Patent, is—

1. The combination of a driven roller, a supporting-roller, and a superimposed tumbling-cylinder which rotates the supporting-roller, substantially as and for the purposes described.

2. The short tumbling-cylinder having a plane surface and a removable water-tight head, substantially as and for the purposes described.

JOHN W. HYATT.

Witnesses:
R. J. D. DUNN,
ABRAHAM MANNERS.